Feb. 15, 1938.   J. S. SHARPE   2,108,083
TRANSMISSION MECHANISM
Filed Aug. 25, 1934   5 Sheets-Sheet 1

Inventor:—
John S. Sharpe
by his Attorneys
Howson & Howson

Feb. 15, 1938.                J. S. SHARPE                2,108,083
                         TRANSMISSION MECHANISM
                       Filed Aug. 25, 1934        5 Sheets-Sheet 2

Inventor:—
John S. Sharpe
by his Attorneys
Howson & Howson

Feb. 15, 1938. J. S. SHARPE 2,108,083

TRANSMISSION MECHANISM

Filed Aug. 25, 1934 5 Sheets-Sheet 5

Inventor:—
John S. Sharpe
by his Attorneys
Howson & Howson

Patented Feb. 15, 1938

2,108,083

UNITED STATES PATENT OFFICE 2,108,083

TRANSMISSION MECHANISM

John S. Sharpe, Haverford, Pa.

Application August 25, 1934, Serial No. 741,468

24 Claims. (Cl. 74—285)

This invention relates to improvements in transmission mechanisms of the rolling adhesion type wherein variations in the speed and torque ratios of the driving and driven parts are accomplished by relative adjustment between rolling elements and parts operatively engaged thereby.

One of the objects of the present invention is to provide a generally improved transmission mechanism of the type set forth capable of efficient operation in the transmission of relatively high powers and including readily operable means for varying the ratio of the velocities of the driving and driven parts and of the torque input and output with a minimum of power losses and without disconnecting the said parts from the power source.

Another object of the invention is to provide a mechanism of the stated character affording a variation in speed and torque ratios between driving and driven shafts continuously progressive between any two points within a range extending between a desirable maximum and a direct drive relation between the said shafts.

Another object of the invention is to provide a mechanism of the stated character in which movement of readily adjustable elements effects a continuously progressive change in the velocity and torque ratios of the driving and driven parts over any portion of a range extending between a maximum and a direct drive relation between said parts, and vice versa.

Still another object of the invention is to provide a mechanism of the stated character comprising a novel automatic control mechanism, as hereinafter more fully set forth.

A still further object of the invention is to provide a mechanism of the type set forth incorporating a novel and improved reversing mechanism.

A further object of the invention is to provide a mechanism of the stated type comprising in novel combination rolling adhesion mechanism and a positive gear unit, said unit being of novel form and relatively high efficiency.

The invention further resides in certain mechanical details and combinations of elements hereinafter set forth and illustrated in the attached drawings in which.

Figure 1:
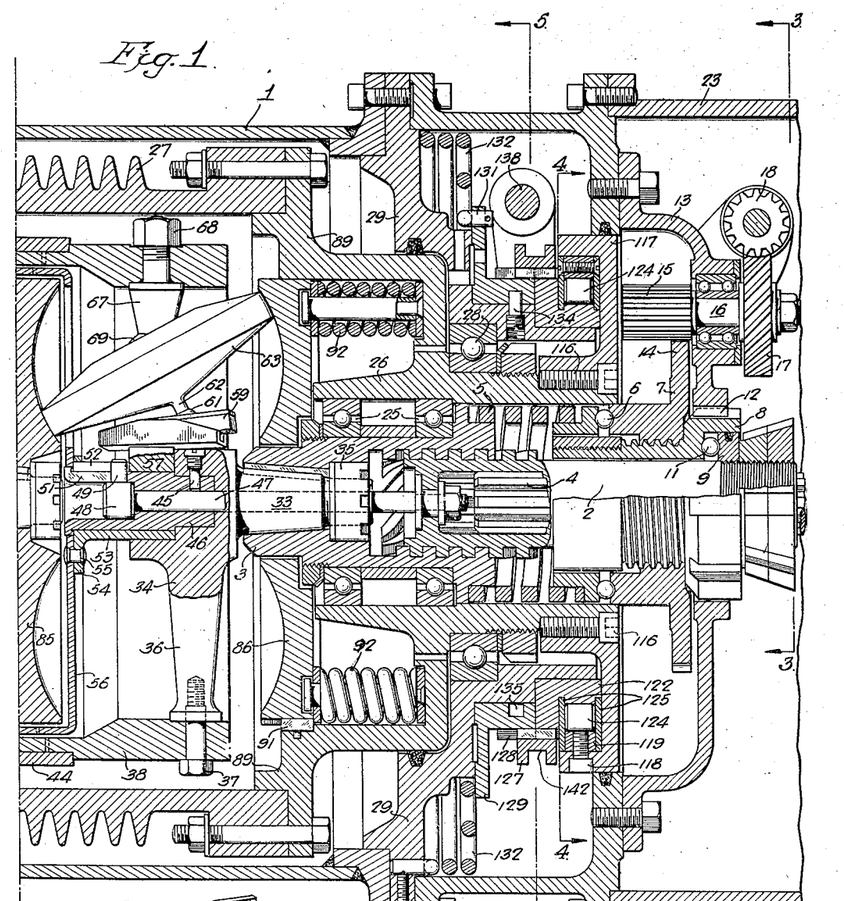
Figures 1 and 2 are respectively longitudinal sectional views of the opposite ends of a transmission mechanism made in accordance with my invention.
Figure 3:
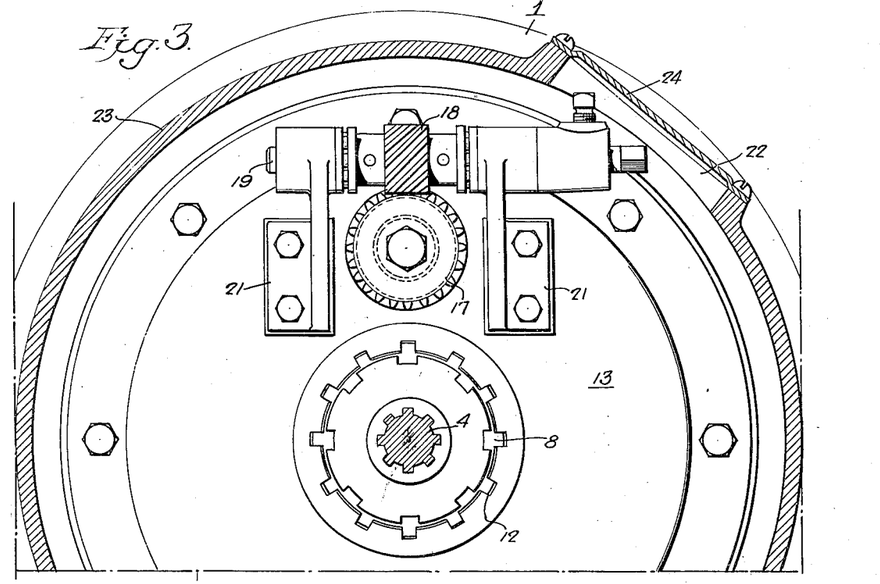
Figs. 3, 4, and 5 are, respectively, transverse sectional views on the lines 3—3, 4—4 and 5—5, Fig. 1.

With reference to the drawings, the reference numeral 1 indicates a housing forming a part of the fixed framework of the mechanism and in which the various movable parts of the mechanism are mounted. This mechanism comprises a drive shaft consisting of an outer axially movable section 2 and an inner section 3 substantially fixed as to axial movement. Both of the shaft sections 2 and 3 are hollow, the section 2 being recessed from the outer end and being interiorly splined for reception of a correspondingly splined shaft 4, through which the section 2 may be coupled with a suitable source of power. The inner end of the section 2 is provided with a helical thread which engages a corresponding thread in the interior of the section 3 whereby relative rotation of these sections results necessarily in an axial adjustment of the section 2. The section 2 is normally held in a relatively extended position with respect to the section 3 by means of a coiled spring 5 interposed between the sections, as illustrated in Fig. 1. The outer end of the spring 5 engages through a thrust bearing 6 the inner end of a nut 7 which is threaded on a sleeve 8 embracing the shaft section 2, and outward axial movement of the sleeve 8 with respect to the section 2 is prevented by a nut 9 threaded on the outer end of the section 2 and an interposed thrust bearing 11. The sleeve 8 has a splined connection at 12 with an inwardly extending casing section 13 which prevents rotation of the sleeve while permitting axial movement. The nut 7 has a flange 14, the periphery of which is provided with teeth for engagement with a pinion 15 carried by a shaft 16 supported in bearings in the casing extension 13, and the outer end of the shaft 16 carries a spiral gear 17 meshing with a spiral pinion 18, this pinion being carried by a shaft 19 supported in brackets 21, 21 on the casing extension 13, as shown in Fig. 3. The projecting extremity of the shaft 19 is formed for reception of a wrench whereby the shaft may be turned to effect an axial adjustment of the nut 7 upon the sleeve 8, to thereby maintain close engagement of the nut 7 with the spring 5 and the latter under proper tension. As shown in Fig. 3, the end of the shaft 19 which receives the wrench is accessible through a port 22 in the housing extension 23, which port is normally closed by a removable cover-plate 24.

Figures 2, 9:
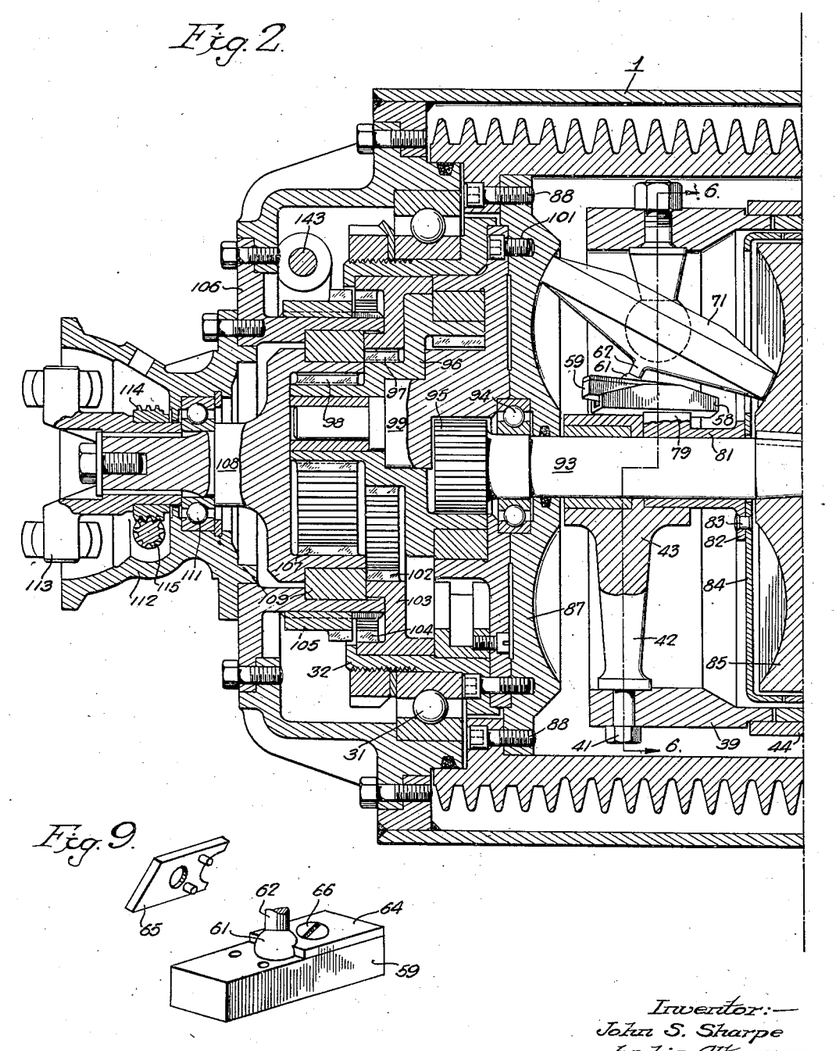
Figs. 8 and 9 are views in perspective of elements of the mechanism shown in the preceding figures.

As shown in Fig. 1, the shaft section 3 is journaled on bearings 25 in the hub extension 26 of a rotary casing member 27, this member 27 being supported in the housing 1 at one end upon a bearing 28 interposed between the hub extension 26 and the inwardly extending flange 29 of the housing; and at the opposite end, see Fig. 2, upon a bearing 31 interposed between the housing 1 and an axially extending cylindrical flange 32 of the casing.

Figure 6:
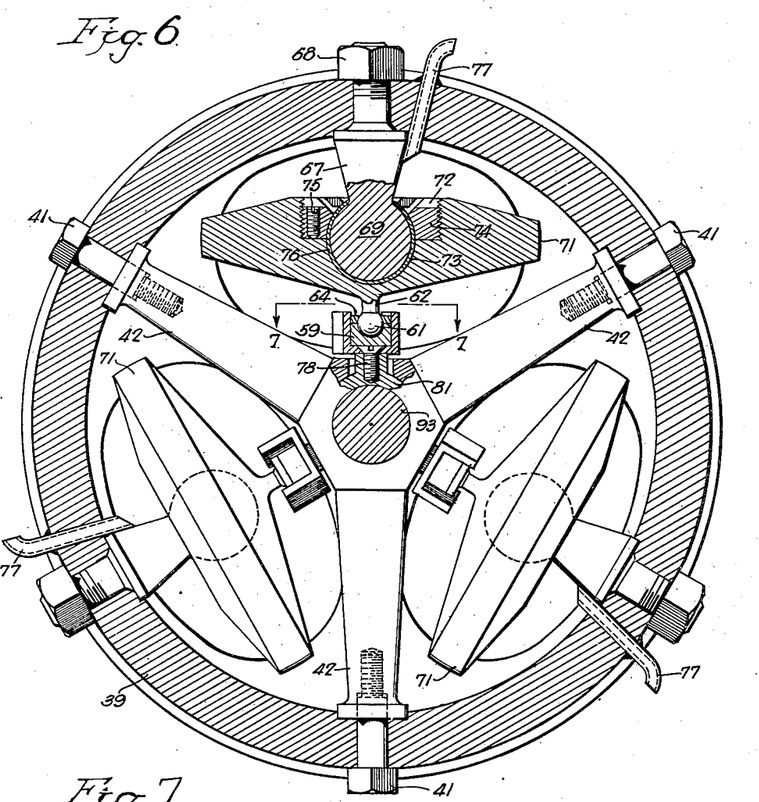
Fig. 6 is a section on the line 6—6, Fig. 2.

The inner end of the shaft section 3 is keyed to a tapered projection 33 of a spider 34, and is secured to the extension 33 by a nut 35 on the outer end of the latter. The three evenly spaced arms 36 of the spider 34 are secured by screws 37 to a cylindrical member 38, the inner end of which member interlocks with a corresponding cylindrical member 39, see Fig. 2, to which member is secured by screws 41 three evenly spaced arms 42 of a second spider 43 corresponding to the spider 34. The interlocked ends of the cylindrical members 38 and 39 are further united by a closely fitting sleeve 44 which embraces the adjoining interlocked portions of the members. The construction of the spiders 34 and 43 is illustrated in Fig. 6.

Figure 8:
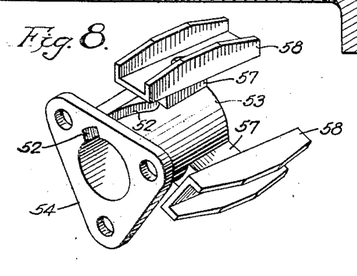

Secured within the hub of the spider 34 by means of a set screw 45 is a cylindrical member 46, this member 46 as well as the spider 34 and the tapered extension 33 of the latter having an axial bore for reception of a rod 47. One end of this rod is secured as shown in Fig. 1 in the inner end of the shaft section 2, and the other end of the rod has a head 48 which occupies an axial recess in the inner end of the member 46. The head 48 has a radially projecting pin 49 which projects through and beyond a longitudinal slot 51 in the member 46. The outer end of this pin 49 occupies a slot 52 in a member 53, see Fig. 8, which member embraces the member 46 and has at its inner end a projecting flange 54 which is secured by means in the present instance of rivets 55 to cup-shaped element 56. The slot 52 extends at an angle to the axial direction of the member 53 so that axial movement of the rod 47 and of the pin 49 which is guided in the slot 51 of the member 46 results by reason of the action of the pin 49 in the slot 52 in a rotative adjustment of the member 53 upon the member 46.

The member 53 has integral radial block-like extensions 57 which extend outwardly through recesses in the hub of the spider 34, and each of these extensions has secured to its outer end a trough-like element 58 which as illustrated are arranged longitudinally at an angle to the axial direction of the member 53.

Figure 7:
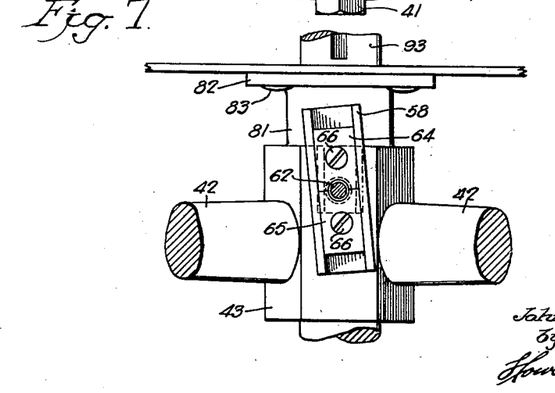
Fig. 7 is a fragmentary section on the line 7—7, Fig. 6.

Slidably guided in each of the troughs 58 is a block 59, these blocks as illustrated in Fig. 9 being formed with a semi-cylindrical socket for reception of a ball 61 at the end of an axial projection 62 of a roller 63. In each instance, the ball 61 is movably held in the socket of the associated block 59 by means of retaining plates 64 and 65 secured to the said blocks by means in the present instance of screws 66. Each of the rollers 63 is supported in the member 38 by means of studs 67, these studs being secured by nuts 68 in the member 38 and having spherically formed inner ends 69 which are received in correspondingly formed sockets in the outer faces of the rollers. A corresponding set of rollers 71 is similarly supported in the member 39, as shown in Figs. 2 and 6, and the elements of the rollers 71 and their supporting means are accordingly given the same reference numerals as applied to the rollers 63 and the parts associated with the latter. Thus with reference to Fig. 6, it will be noted that the rollers are provided with a threaded countersunk recess 72, in the bottom of which is formed a socket 73 for reception of the spherical extremity 69 of the stud 67. The rollers are secured to the sphere 69 by means of a suitably formed nut 74 threaded into the countersunk recess 72, said nut having curved surfaces conforming to the sphere 69 and being secured in the countersunk recess by means of a set screw 75. Preferably and as shown in Fig. 6, each of the spheres 69 is provided with a correspondingly formed bushing 76 upon which the roller bears. It will be apparent that each of the rollers is afforded a universal movement upon its supporting sphere. In each case, lubrication for the bearing may be provided by means of tubes 77 extending through and secured in the supporting cylindrical member, the outer ends of the tubes being turned in the direction of normal rotation of the said members, as hereinafter set forth. Each of the rollers 71, as in the case of the rollers 63 previously described, has at its inner side an axial projection 62 terminating in a spherical extremity 61, and each of these spherical extremities is engaged in a block 59 as previously described, which blocks are slidably guided in troughs 58 secured as shown in Fig. 7 by means of screws 78 to block-like radial extensions 79 of a member 81 corresponding in general form to the member 53 previously described and illustated in Fig. 8. The flange 82 of the member 81 is secured in the present instance by rivets 83 to a cup-shaped member 84, and the peripheral edges of this member interlock with the peripheral edges of the reversely positioned member 56, as indicated in Figs. 1 and 2. In this manner, any rotational movement of the member 53 results in a corresponding adjustment of the member 81.

As illustrated in Figs. 1 and 2, the rollers 63 and 71 occupy torroidal spaces between an intermediate disk 85 and disks 86 and 87, respectively, carried at opposite ends of the casing 27. The disk 87 is solidly secured by screws 88 to the casing 27, while the disk 86 is mounted for axial movement in the end member 89 of the casing while being prevented from rotation with respect thereto by a key 91. Interposed between the disk 86 and the head 89 and urging the disk towards the roller 63 is a series of coiled springs 92, these springs being calibrated to afford a desired compressing force between the disks and the rollers of both sets. Other means for effecting this compressive force may be employed without departing from the invention.

The disk 85 is carried on and keyed to the inner end of a shaft 93, and the outer end of this shaft, which is supported in a bearing 94, carries a spur gear pinion 95 which meshes with an internal gear formed in a member 96, which also comprises external gears 97 and 98. The member 96 is journaled for rotation upon a member 99 secured by screws 101 to the disk 87, the axis of this journal being eccentric to the axis of the shaft 93. The external gear 97 of the member 96 meshes with an internal gear 102 formed on a member 103, which member also comprises one element 104 of a dog clutch, the other end adjustable element 105 of which is splined on the end member 106 of the housing 1. When the clutch element 105 is in the retracted position as shown in Fig. 2, the member 103 is free to rotate within the flange 32 of the casing 27, upon which this member is journaled.

The pinion 98 of the member 96 meshes with an internal gear 107 formed in a stub shaft 108 supported at its inner end upon a sleeve 109 carried by the housing member 106, and journaled at its other end upon a bearing 111 in the terminal member 112 of the housing. The shaft 108 which constitutes the driven shaft of the assembly is coaxial with the shaft 93 and with the drive shaft 2—3, and these shafts as previously set forth are also coaxial with the spiders 36 and 42. Secured to the end of the shaft 108 is a coupling element 113 by means of which this shaft may be connected to the driven mechanism. This coupling member 113 also carries a worm 114 which meshes with a worm wheel 115 through which connection may be established with odometer speedometer instruments. It will be noted that in the positive gear mechanism described above, each spur gear operates in an internal gear.

Figure 4:
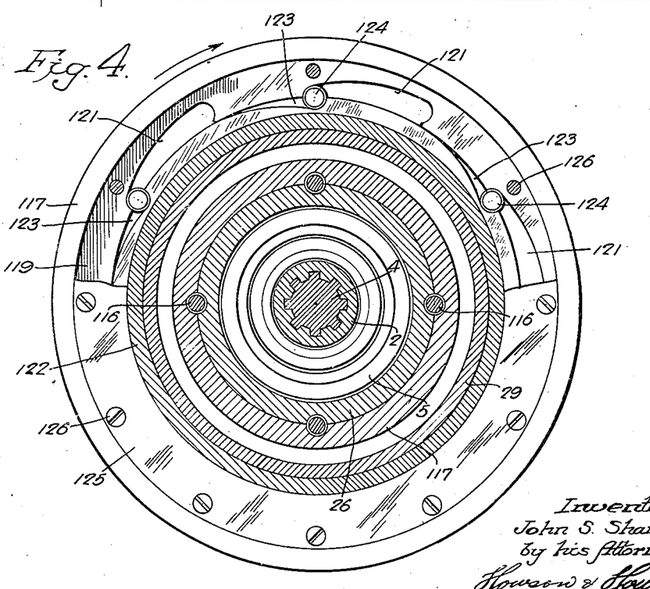

With reference again to Fig. 1, the hub extension 26 of the casing 27 has secured thereto through the medium of screws 116 a flange 117, and to this flange is secured by means of screws 118 an annular member 119, the inner face of which as illustrated in Fig. 4 is formed with a series of eccentric recesses 121. Rotatably mounted on the inwardly extending flange 29 of the housing is a member 122 having a portion concentric with and spaced inwardly from the member 119, and the peripheral portion of this member opposed to the member 119 also as shown in Fig. 4 is formed with a series of eccentric recesses 123. Between the members 119 and 122 is located a series of rollers 124 which are held in position by side plates 125 secured by screws 126 to the opposite sides of the member 119. The recesses 123 and 121 are so formed and the members 119 and 122 so relatively positioned that the rollers 124 prevent rotation of the member 119 and of the flange 117 to which the member 119 is secured in the direction of the arrow, Fig. 4, but reverse rotation of the members 119 and 117 is permitted. Since the rollers 124 necessarily are carried with the member 119 when the latter is rotating, it will be apparent that centrifugal force tends to throw the rollers outwardly and away from the member 122 so that the rollers are disengaged from the latter member and exert no frictional retarding force to the rotation of the members 119 and 117.

Figure 5:
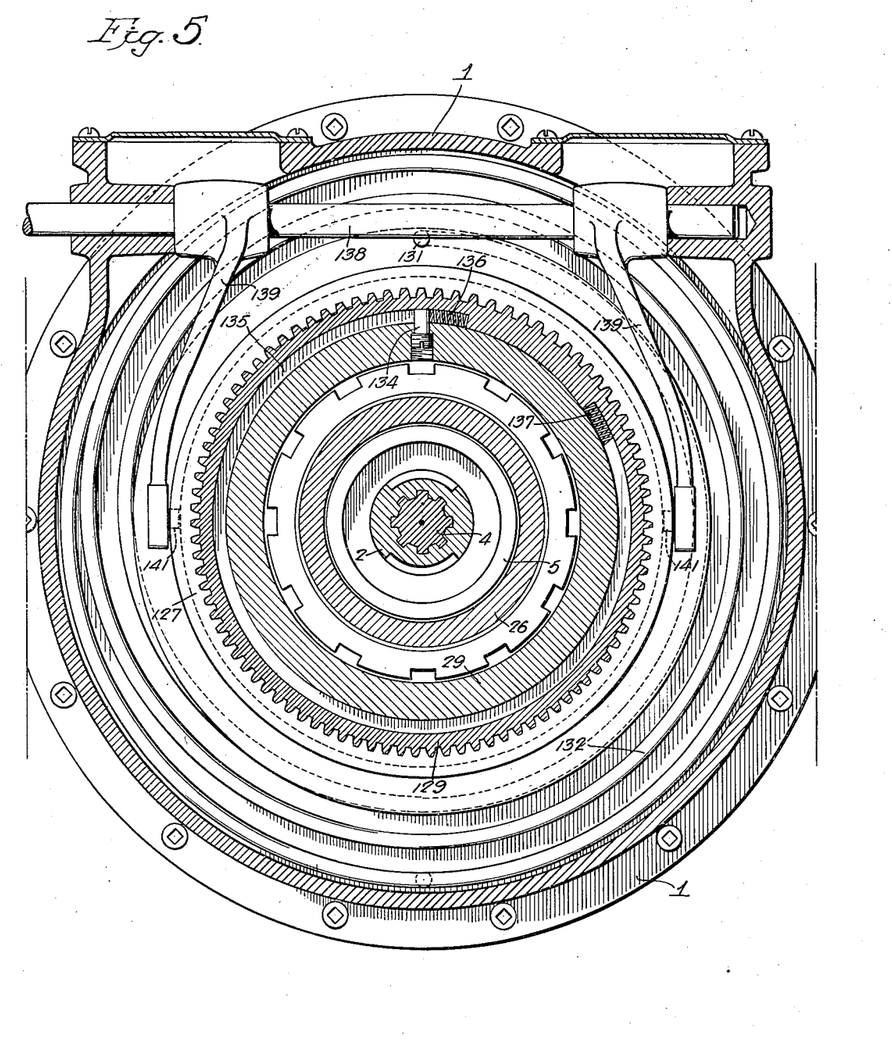

The outer peripheral portion of the member 122 is provided with teeth which are adapted to be engaged by a dog 127 when the latter is in a position as shown in Fig. 1. This dog also engages teeth 128 upon a member 129 which is secured at 131 to one end of a coiled spring 132, the opposite end of this spring being secured by a set screw 133 in the flange 29 of the housing 1. A set screw 134 threaded into the flange 29 projects into a circumferential groove 135 in the member 129, this groove as shown in Fig. 5 extending around only a portion of the circumference of the member in which it is formed, so that the set screw 134 limits the relative rotational movement of the member 129 with respect to the flange 29. When, therefore, the dog 127 is interlocked both with the member 122 and the member 129, as shown in Fig. 1, the casing 27 instead of being completely immobilized with respect to the housing 1 in the one direction by the rollers 124, is permitted a movement in that direction against the tension of the spring 132 to an extent determined by the length of the groove 135. At the end of this movement, however, the rollers 124 are effective, as previously described, to definitely immobilize the casing 89 against further movement in the one direction. It will be noted with reference to Fig. 5, that springs 136 and 137 are located at the opposite ends of the groove 135 to engage the pin 134 and thereby cushion the engagement of the pin with the end walls of the groove.

When the dog 127 is shifted to the left, see Fig. 1, to a position disengaged from the member 122, the latter is free to rotate so that the rollers 124 are ineffective to control rotation of the casing 27 in either direction. As shown in Fig. 5, the dog 127 may be adjusted through the medium of a rock shaft 138 journaled in the housing 1 and having arms 139 provided with pins 141 which project into a circumferential groove 142, see Fig. 1, in the dog. The shaft 138 projects through the wall of the housing 1, as also, see Fig. 2, does the rock shaft 143 through which by similar devices the clutch element 105 may be adjusted. In operation, the shafts 138 and 143 preferably are connected for simultaneous adjustment to shift the dog 127 and the element 105 into the positions in which they are shown in Figs. 1 and 2 or into their alternative positions in which the dog 127 releases the member 122 and the clutch element 105 engages the element 104.

The aforedescribed assembly may be said to comprise in effect driving and driven planetary members, said members being constituted respectively by the rollers 63 and 71 collectively, which are connected to the drive shaft 2—3, and by the member 96, which through the pinion 98 is connected to the driven shaft 108. The torroidal disk 85, its shaft 93, and pinion 95 then constitute one train of transmission elements establishing an operative connection between the said driving planetary and the driven planetary; and a second train of elements, consisting of the torroidal disks 86, 87, the casing 27, and the member 99, forms a second line of transmission between said planetaries. Through both of these two trains, simultaneously forces may be transmitted from the driving to the driven planetaries, and the relative values of these forces may be varied by adjustment of the driving planetaries between the torroidal disks, as described. When these forces are unbalanced with respect to the load imposed upon the driven planetary through the annular gear 107 and pinion 98, which occurs when the rollers 63 and 71 are in the reverse position of adjustment from that shown in Figs. 1 and 2, the transmission elements 86, 87, 27, and 99 remain stationary and function in effect as a reaction group against which the planetaries may react to exert through the other transmission line composed of the elements 85, 93, and 95 and through the driven planetary 96, a maximum torque upon the driven shaft to move the load. When the forces transmitted through the aforesaid transmission lines are in effect balanced with respect to the load, which occurs when the rollers 63 and 71 are in the positions of adjustment between the torroidal discs shown in Figs. 1 and 2, the entire system tends to rotate as a unit about the axis of the shaft 93, so that a direct drive connection between the drive shaft 2—3 and the driven shaft 108 is established, with transmission of relatively low torque. The speed ratios of the drive and driven shafts vary inversely with the torque factor.

In the operation of the aforedescribed mechanism, let it be assumed that with the parts in the relative positions shown in Figs. 1 and 2, power is applied to the drive shaft 2—3 to move a load imposed upon the driven shaft 108. The immediate result of this application of power to the drive shaft, by reason of the inertia of the elements of the mechanism and of the load applied to the driven shaft, is to cause a relative rotation of the section 2 of the drive shaft with respect to the section 3 and a consequent axial adjustment of the shaft section 2 through the medium of the helical tooth connection between the sections. The axial movement of the shaft section 2 causes a corresponding axial movement of the rod 47, and this movement of the rod through the pin 49 and the angularly positioned slot 52 of the member 53 causes a partial rotation of the latter member, this rotative movement of the member 53 being transmitted through the members 56 and 84 to the corresponding member 81 associated with the rollers 71. This movement of the members 53 and 81, through the trough elements 58 and blocks 59, effects an adjustment of the rollers 63 and 71 about transverse axes extending respectively through the points of contact of these rollers with the disks 85, 86, and 87. When thus angularly displaced from their normal planes between the associated disks, the rollers 63 and 71, assuming a relative rotation of the disk 85 with respect to the disks 86 and 87, will have a tendency to precess from the positions in which they are shown to opposite positions wherein the rollers engage the outer portion of the disk 85 and the inner portions of the disks 86 and 87. It will be understood that the parts are so relatively arranged that the original adjustment of the rollers 63 and 71 is in a direction effecting this precessional movement.

As stated above, the precessional movement is predicated upon a relative rotational movement of the disk 85 with respect to the disks 86 and 87. It will be apparent that when the axial movement of the shaft section 2 has progressed to its ultimate limit, the power applied to the shaft section 2 will be transmitted directly to the shaft section 3, thereby tending to rotate the spiders 36 and 42, the members 38 and 39 to which the spiders are secured, and the planetary rollers 63 and 71. The resulting force applied to the rollers 63 and 71 tends to rotate the disk 85 and the disks 86 and 87 in the same direction. This force applied to the disks 86 and 87 is transmitted to the casing 27 and member 98, and tends to move this member in an orbital path and to carry with it in the same orbital path the member 96. Since the driven shaft 108 by reason of the load applied thereto resists rotation, the tendency of the orbital movement of the member 96 as described is to effect a rotation of this member upon its bearing on the member 99 through the medium of the pinion 98 which engages the internal gear 107 on the driven shaft. The turning force applied through the rollers 63 and 71 upon the disk 85 tends to rotate the pinion 95 connected to that disk in the same direction, and thereby tends to rotate the member 96 about its axis on the member 99 but in a direction opposite to that effected through the disks 86 and 87 as previously described. The rotative force applied through the pinion 95 upon the member 96 by reason of the relative positions of the parts is greater than the rotative force applied through the member 99, so that the pinion 98 is caused to track upon the internal gear 107 to effect an orbital movement of the member 99 and a rotation of the casing 27 and the disks 86 and 87 in a direction reverse to the direction of rotation of the driving shaft 2—3. This reverse rotation of the casing 27 takes place against the tension of the spring 132 as previously described, and is limited by the length of the groove 135 in which the stop pin 134 is located. The extent of this reverse movement of the casing 27 and of the disks 86 and 87 is sufficient, however, to effect the precessional adjustment of the rollers 63 and 71, as previously described, to a reverse angular position from that in which they are shown in Figs. 1 and 2, in which reverse position the rollers engage the outer portion of the disk 85 and the inner portions of the disks 86 and 87. In this precessional movement of the rollers 63 and 71 and by reason of the angularity of the troughs 58 with respect to the common axis of the spiders 36 and 42, the rollers are again adjusted upon the transverse axes through their points of contact with the disks 85, 86, and 87, but this time in a direction reverse to the original adjustment on these axes effected through the axial movement of the rod 47, so that when the rollers have reached the end of the precessional movement, they occupy a normal position between the disks 85, 86, and 87.

Since now further reverse rotation of the casing 27 and of the disks 86 and 87 is prevented by the stop pin 34 and the rollers 124 as previously described, the disks 86 and 87 function as fulcrums for the rollers 63 and 71, so that the entire turning force applied through the driving shaft upon the rollers 63 and 71 tending to move the rollers in their orbital paths between the disks is applied to the disk 85, and this force is amplified by the advantageous leverage obtained by the aforedescribed precessional adjustment of the rollers. This amplified force is applied through the shaft 93 and pinion 95 to the member 96 and tends to rotate this member upon its axis on the member 99 so as to rotate the driving shaft through the pinion 98 and the internal gear 107 against the load and in the same direction as the drive shaft 2—3 and the intermediate shaft 93. Assuming that this force is sufficient to overcome the inertia of the load upon the driven shaft, it will be apparent that as the driven shaft 108 gains momentum, the relative torque between the drive shaft sections 2 and 3 becomes progressively reduced, so that the spring 5 becomes effective to extend the shaft by axial movement of the section 2 to the right, see Fig. 1, said section carrying with it the rod 47 and thereby through the pin 49 and member 53 effecting a tilting of the rollers 63 and 71 about the transverse axis through the points of contact of said rollers with the disks 85, 86, and 87 in a direction tending to cause the rollers to precess between the disks toward their original positions, as shown in Figs. 1 and 2. In this precessional movement of the rollers 63 and 71, the ratio of speeds between the driving and driven shafts is progressively reduced toward unity, and when the rollers have finally advanced in their precessional movement to the positions shown in Figs. 1 and 2, the mechanism is substantially balanced, so that all of the moving parts embraced and supported by the casing 27 tends to rotate as a unit with a direct drive relation between the driving and driven shafts. In this precessional movement also the tilted position of the rollers on the axes through the points of contact with the disks 85, 86 and 87 is progressively corrected, so that the rollers are returned automatically to their normal positions as regards this axis of adjustment.

It should be noted that in the high speed or direct drive relation of the parts, as shown in Figs. 1 and 2, the rollers 63 and 71 never reach a position affording an exact theoretical condition of balance in the mechanism as a whole, effective balance and the direct drive relation being obtained in advance of the theoretically correct position of adjustment of the rollers by reason of the frictional resistance to movement of the various elements of the mechanism. This feature is responsible for a valuable characteristic of the transmission. Assume for example that the transmission is employed in a motor vehicle and the vehicle is proceeding at relatively high speed in the direct drive relation. Under these conditions, the inertia of the moving parts, such for example as that arising from the momentum of the casing 27, is sufficient in the event of a requirement for acceleration of the vehicle to preclude automatic adjustment of the rollers 63 and 71 toward their low speed positions, so that the acceleration may be accomplished without affecting the direct drive relation. If on the other hand, the vehicle is progressing at a low rate of speed and sudden acceleration is required, the inertia of the moving parts is not sufficient to overcome the natural tendency toward precession of the rollers toward the low speed positions resulting from the actual slightly unbalanced relation of the parts, so that the immediate result of the increased torque applied to the driving shaft is a sufficient precessional movement of the rollers 63 and 71 from the direct drive positions to increase the torque ratio of the driving and driven shafts to an extent accommodating the increased power requirement. The total effect, therefore, is one of speed as well as torque control of the transmission.

To effect a reverse rotation of the driven shaft 108, the rock shafts 138 and 143 are actuated to disengage the dog 127 from the member 122 and to engage the clutch element 105 with the element 104 of the member 103. As previously set forth, this has the effect of rendering the rollers 124 ineffective to prevent reverse rotation of the casing 27, and by engagement of the elements 105 and 104 immobilizes the member 103, which otherwise is free to rotate. By thus immobilizing the member 103, the member 96 under the driving thrust of the pinion 95 is caused to move in its orbital path in a reverse direction, carrying with it through the medium of the pinion 98 the drive shaft 108.

In the application of this transmission to motor vehicles, it is desirable to connect the transmission to the power source through an automatic clutch, such clutches being well known in the art. By adjusting the clutch for engagement at low speeds, sudden violent application of power to the transmission, such for example as might occur in use of the standard manually-controlled clutch, will be avoided.

It is understood that there may be modification in the detail structure of the mechanism without departure from the principles of the invention as defined in the appended claims.

I claim:

1. A transmission comprising interconnected planetary systems mounted for joint rotation as a unit with the elements of each system in relatively fixed relation, one of said systems being of the geared or positive type and the other being of the rolling adhesion or friction type, a driven member connected to the first-named system, a driving member connected to the planetary element of the second-named system, means for relatively adjusting said planetary element in its system to vary the torque ratio of the driving and driven members, said planetary element in a given adjusted position effecting a balance of forces tending to rotate the systems in said unitary relation, and means for controlling the movement of an element of each of said systems for transmission of power between the driving and driven members when said planetary element is in another position of adjustment, said means comprising an overrunning clutch device effective to prevent rotation of said controlled element in one direction while permitting free rotation thereof in the opposite direction, and means associated with said clutch for permitting a limited rotation of said element in the first-named direction.

2. A transmission comprising interconnected planetary systems mounted for joint rotation as a unit with the elements of each system in relatively fixed relation, one of said systems being of the geared or positive type and the other being of the rolling adhesion or friction type, and said systems having an element in common, a driven member connected to the first-named system, a driving member connected to the planetary element of the second-named system, means for relatively adjusting said planetary element in its system to vary the torque ratio of the driving and driven members, said planetary element in a given adjusted position effecting a balance of forces tending to rotate the systems in said unitary relation, and means for controlling the movement of said common element for transmission of power between the driving and driven members when said planetary element is in another position of adjustment, said controlling means comprising an overrunning clutch effective to prevent movement of said common element in one direction of rotation while permitting free rotation of said element in the opposite direction, and means operatively associated with said clutch for permitting a limited rotation of the said element in the first-named direction.

3. A transmission comprising interconnected planetary systems mounted for joint rotation as a unit with the elements of each system in relatively fixed relation, one of said systems being of the geared or positive type and the other being of the rolling adhesion or friction type, a driven member connected to the first-named system, a driving member connected to the planetary element of the second-named system, means for relatively adjusting said planetary element in its system to vary the torque ratio of the driving and driven members, said planetary element in a given adjusted position effecting a balance of forces tending to rotate the systems in said unitary relation, and means for controlling the movement of an element of each of said systems for transmission of power between the driving and driven members when said planetary element is in another position of adjustment, said means permitting limited rotation of said element in one direction and unlimited rotation of said element in the opposite direction.

4. A transmission comprising interconnected planetary systems mounted for joint rotation as a unit with the elements of each system in relatively fixed relation, one of said systems being of the geared or positive type and the other being of the rolling adhesion or friction type, a driven member connected to the first-named system, a driving member connected to the planetary element of the second-named system, means for relatively adjusting said planetary element in its system to vary the torque ratio of the driving and driven members, said planetary element in a given adjusted position effecting a balance of forces tending to rotate the systems in said unitary relation, and means for controlling the movement of an element of each of said systems for transmission of power between the driving and driven members when said planetary element is in another position of adjustment, said controlling means comprising an overrunning clutch device effective to prevent rotational movement of the controlled element in one direction, and means providing for limited movement of said device with said element.

5. A transmission comprising interconnected planetary systems mounted for joint rotation as a unit with the elements of each system in relatively fixed relation, one of said systems being of the geared or positive type and the other being of the rolling adhesion or friction type, a driven member connected to the first-named system, a driving member connected to the planetary element of the second-named system, means for relatively adjusting said planetary element in its system to vary the torque ratio of the driving and driven members, said planetary element in a given adjusted position effecting a balance of forces tending to rotate the systems in said unitary relation, and means for controlling the movement of an element of each of said systems for transmission of power between the driving and driven members when said planetary element is in another position of adjustment, said controlling means comprising an overrunning clutch device effective to prevent rotational movement of the controlled element in one direction, means providing for limited movement of said device with said element, and resilient means tending to prevent movement of said device with said element in the last-named direction.

6. The combination with planetary driving and driven members movable in orbital paths about a common axis, and means for applying a load to said driven member, of a pair of rotary torroidal elements rotatable about said orbital axis and having frictional engagement respectively with opposite sides of said planetary driving member, means for independently operatively connecting said torroidal elements with the said driven member, each of said means consisting of rotary elements mounted for rotation about said orbital axis, and said torroidal elements and their respective connecting means forming two paths for simultaneous transmission of forces from the driving to the driven planetary, said planetary driving member being adjustable by precessional movement between and with respect to said torroidal elements to relatively vary the said forces transmitted to the driven planetary, and in different positions of said precessional adjustment affording a balance of said forces with respect to the load and varying conditions of unbalance, means for relatively adjusting said driving member and said torroidal elements to initiate said precessional movement, and means for limiting rotation of that one of the torroidal elements transmitting the force of lesser effectiveness with respect to the load in a direction reverse to that in which the impulse is applied thereto by the driving member and to an extent effecting a maximum precession of said driving member in one direction.

7. The combination with planetary driving and driven members movable in orbital paths about a common axis, and means for applying a load to said driven member, of a pair of rotary torroidal elements rotatable about said orbital axis and having frictional engagement respectively with opposite sides of said planetary driving member, means for independently operatively connecting said torroidal elements with the said driven member, each of said means consisting of rotary elements mounted for rotation about said orbital axis, and said torroidal elements and their respective connecting means forming two paths for simultaneous transmission of forces from the driving to the driven planetary, said planetary driving member being adjustable by precessional movement between and with respect to said torroidal elements to relatively vary the said forces transmitted to the driven planetary, and in different positions of said precessional adjustment affording a balance of said forces with respect to the load and varying conditions of unbalance, means for relatively adjusting said driving member and said torroidal elements to initiate said precessional movement, an overrunning clutch mounted for movement as a unit with that one of the torroidal elements transmitting the force of lesser effectiveness with respect to the load, and means for limiting the movement with said torroidal element of one of the members of said clutch to thereby limit the rotation of said torroidal element in a direction reverse to that in which the impulse is applied thereto by the said driving member and to an extent effecting a maximum precession of said driving member in one direction.

8. The combination with planetary driving and driven members movable in orbital paths about a common axis, and means for applying a load to said driven member, of a pair of rotary torroidal elements rotatable about said orbital axis and having frictional engagement respectively with opposite sides of said planetary driving member, means for independently operatively connecting said torroidal elements with the said driven member, each of said means consisting of rotary elements mounted for rotation about said orbital axis, and said torroidal elements and their respective connecting means forming two paths for simultaneous transmission of forces from the driving to the driven planetary, said planetary driving member being adjustable by precessional movement between and with respect to said torroidal elements to relatively vary the said forces transmitted to the driven planetary, and in different positions of said precessional adjustment affording a balance of said forces with respect to the load and varying conditions of unbalance, means for relatively adjusting said driving member and said torroidal elements to initiate said precessional movement, an overrunning clutch mounted for movement as a unit with that one of the torroidal elements transmitting the force of lesser effectiveness with respect to the load, means for limiting the movement with said torroidal element of one of the members of said clutch to thereby limit the rotation of said torroidal element in a direction reverse to that in which the impulse is applied thereto by the said driving member and to an extent effecting a maximum precession of said driving member in one direction, and a spring urging said clutch member in the direction of said impulse.

9. A transmission mechanism comprising driving and driven planetary mechanisms operatively associated with each other to form a series reduction gear train, said mechanisms being mounted for rotation as a unit, the driven mechanism being of the geared or positive type and the driving mechanism being of the rolling adhesion or friction type and being adjustable by precessional movement of the planetary element to vary the speed and torque ratios of the terminal elements of said train between a predetermined maximum and unity, means for relatively adjusting the elements of said driving mechanism to initiate said precessional movement, means for limiting the extent of rotational movement of one of the elements of each mechanism in one direction while permitting unlimited rotational movement of said element in the opposite direction, and means for connecting the planetary element of the driving mechanism with a source of power whereby said planetary element constitutes the driving element of said transmission.

10. A transmission mechanism comprising a pair of planetary mechanisms, two of the elements of each mechanism being common to the other and said mechanisms being mounted for joint rotation as a unit, means for permitting unlimited rotation of one of said common elements in the direction of said joint rotation while limiting the extent of the rotational movement of said common element in the reverse direction whereby said element may constitute a fulcrum upon which the other elements of the mechanism may operate, resilient means for urging said common element in the direction of said joint rotation, and the other of said common elements constituting a transmission link between the terminal driving and driven elements of the joint mechanism, that one of the planetary mechanisms with which the driven terminal element is associated being of the geared or positive type and the other of said planetary mechanisms being of the rolling adhesion or friction type, means for adjusting said latter mechanism to vary the relative impulses exerted in said planetary mechanisms upon the said elements between a predetermined condition of unbalance and a condition of substantial balance wherein the entire mechanism tends to rotate as a unit, and means for connecting the planetary element of the rolling adhesion or friction mechanism with a source of power whereby said planetary element constitutes the driving terminal element of the transmission.

11. The combination with planetary driving and driven members movable in orbital paths about a common axis, and means for applying a load to said driven member, of a pair of rotary torroidal elements rotatable about said orbital axis and having frictional engagement respectively with opposite sides of said planetary driving member, means for independently operatively connecting said torroidal elements with the said driven member, each of said means consisting of rotary elements mounted for rotation about said orbital axis, and said torroidal elements and their respective connecting means forming two paths for simultaneous transmission of forces from the driving to the driven planetary, said planetary driving member being adjustable by precessional movement between and with respect to said torroidal elements to relatively vary the said forces transmitted to the driven planetary, and in different positions of said precessional adjustment affording a balance of said forces with respect to the load and varying conditions of unbalance, means for relatively adjusting said driving member and said torroidal elements to initiate said precessional movement, means for immobilizing that one of the torroidal elements through which the lesser of said forces is transmitted against reverse movement whereby said torroidal element may constitute a fulcrum on which the said driven member is movable under the force exerted through the other of said torroidal elements, and means permitting a limited reverse movement of said first-named torroidal element sufficient in extent to effect a maximum precession of the said driving planetary in one direction.

12. The combination with planetary driving and driven members movable in orbital paths about a common axis, and means for applying a load to said driven member, of a pair of rotary torroidal elements rotatable about said orbital axis and having frictional engagement respectively with opposite sides of said planetary driving member, means for independently operatively connecting said torroidal elements with the said driven member, each of said means consisting of rotary elements mounted for rotation about said orbital axis, and said torroidal elements and their respective connecting means forming two paths for simultaneous transmission of forces from the driving to the driven planetary, said planetary driving member being adjustable by precessional movement between and with respect to said torroidal elements to relatively vary the said forces transmitted to the driven planetary, and in different positions of said precessional adjustment affording a balance of said forces with respect to the load and varying conditions of unbalance, means for relatively adjusting said driving member and said torroidal elements to initiate said precessional movement, means for immobilizing that one of the torroidal elements through which the lesser pressure is transmitted against reverse movement whereby said element may constitute a fulcrum on which the driven planetary is movable under forces exerted through the other of said planetary elements, means permitting a limited reverse movement of the first-named planetary element sufficient in extent to effect a maximum precession of the driving planetary in one direction, and resilient means opposing said limited reverse movement.

13. In a transmission mechanism of the character described, the combination with opposed rotary elements, of a planetary roller confined between said elements and adjustable by precessional movement to relatively vary the distances of the points of contact of the roller with said elements from the common axis of the latter, means for relatively adjusting the roller and said elements whereby subsequent relative rotation of the elements effects said precession, means for immobilizing one of said elements against rotation in a direction reverse to the direction of rotation of the other element, and lost motion means operatively associated with said immobilizing means for permitting a limited initial reverse movement of the one element prior to immobilization.

14. In a transmission mechanism of the character described, the combination with opposed rotary elements, of a planetary roller confined between said elements and adjustable by precessional movement to relatively vary the distances of the points of contact of the roller with said elements from the common axis of the latter, means for relatively adjusting the roller and said elements whereby subsequent relative rotation of the elements effects said precession, means for immobilizing one of said elements against rotation in a direction reverse to the direction of rotation of the other element, lost motion means operatively associated with said immobilizing means for permitting a limited initial reverse movement of the one element prior to immobilization, and resilient means opposing said initial reverse movement.

15. The combination with rotary driving and driven members, of an intermediate rotary transmission member and a rotary reaction member, means including a planetary element operatively engaging the intermediate and reaction members for operatively connecting said members with the driving member, means for adjusting said element to relatively vary the torques imposed by said planetary element upon the reaction and intermediate members, a toothed gear carried by said intermediate member, a planetary member journaled on said reaction member on an axis eccentric to the axis of the latter, said planetary member comprising internal and external gear elements, the said gear of the intermediate member meshing with said internal element, an internal gear on the driven member meshing with the external gear element of said planetary member, and means for immobilizing the reaction member against rotation in a direction opposite to the rotary movement of the driving member.

16. The combination with coaxial rotary driving and driven members, of an intermediate rotary transmission member and a rotary reaction member both coaxial with said driving and driven members, means including a planetary element operatively engaging the intermediate and reaction members for operatively connecting said members with the driving member, means for adjusting said element to relatively vary the torques imposed by said planetary element upon the reaction and intermediate members, a toothed gear carried by said intermediate member, a planetary member journaled on said reaction member on an axis eccentric to the axis of the latter, said planetary member having an internal gear meshing with the toothed gear of said intermediate member and having also an external gear, and an internal gear carried by said driven member meshing with the external gear of said planetary member, and means for immobilizing the reaction member against rotation in a direction opposite to the rotary movement of the driving member.

17. The combination with rotary driving and driven members, of an intermediate rotary transmission member and a rotary reaction member, said members being coaxial, a planetary roller element carried by the driving member and operatively engaging surfaces of both the intermediate and reaction members, means for adjusting said planetary rollers to relatively vary the torques imposed thereby upon the intermediate and reaction members, a pinion carried by the intermediate member, a planetary member journaled on the reaction member and having an internal gear element meshing with said pinion, said planetary member having also an external gear element, an annular gear carried by the driven member and meshing with said external gear element, and means for immobilizing the reaction member against rotation in a direction opposite to the direction of rotation of said driving member.

18. The combination with rotary driving and driven members, of an intermediate rotary transmission member and a rotary reaction member, said members being coaxial, a planetary roller element carried by the driving member and operatively engaging surfaces of both the intermediate and reaction members, means for adjusting said planetary rollers to relatively vary the torques imposed thereby upon the intermediate and reaction members, a pinion carried by the intermediate member, a planetary member journaled on the reaction member and having an internal gear element meshing with said pinion, said planetary member having also an external gear element, an annular gear carried by the driven member and meshing with said external gear element, and means for immobilizing the reaction member against rotation in a direction opposite to the direction of rotation of said driving member, said gear elements and planetary rollers being so relatively arranged with respect to the common axis of said driving and driven members that in a predetermined position of adjustment of said planetary rollers the said members tend to rotate as a unit affording a direct drive connection between the driving and driven members.

19. In a transmission mechanism of the character described, the combination with opposed rotary elements, of a planetary roller confined between said elements and adjustable by precessional movement to relatively vary the distances of the points of contact of the roller with said elements from the common axis of the latter, a rotary support for said roller, ball and socket means providing a swivel journal for the roller on said support, and means for adjusting the roller about an axis through the points of contact of the roller with said rotary elements, said means comprising a relatively fixed channel member adjustable about the axis of said rotary elements, and a block guided in said channel and having a swivel connection with the roller.

20. In a transmission mechanism of the character described, the combination with opposed rotary elements, of a planetary roller confined between said elements and adjustable by precessional movement to relatively vary the distances of the points of contact of the roller with said elements from the common axis of the latter, a rotary support for said roller, ball and socket means providing a swivel journal for the roller on said support, means for adjusting the roller about an axis through the points of contact of the roller with said rotary elements, said means comprising a relatively fixed channel member adjustable about the axis of said rotary elements, and a block guided in said channel and having a swivel connection with the roller, said channel being arranged at an angle to an intersecting plane through the axis of the rotary elements whereby a precessional movement of the roller following an adjustment of the latter through the medium of the channel member tends to return the roller to a normal position with respect to the axis thereof through said points of contact.

21. The combination with rotary driving and driven members, of an intermediate rotary transmission member and a rotary reaction member, means including a planetary element operatively engaging the intermediate and reaction members for operatively connecting said members with the driving member, means for adjusting said element to relatively vary the torques imposed by said planetary element upon the reaction and intermediate members, a toothed gear carried by said intermediate member, a planetary member journaled on said reaction member on an axis eccentric to the axis of the latter, said planetary member comprising an internal gear element and a plurality of external gear elements, the said gear of the intermediate member meshing with said internal element, an internal gear on the driven member meshing with one of the external gear elements of said planetary member, a normally free internal gear meshing with another of the external gear elements of the planetary member, means for immobilizing the reaction member against rotation in a direction opposite to the rotary movement of the driving member, means for rendering the said immobilizing means inoperative, and means for immobilizing said normally free internal gear.

22. In a transmission mechanism, the combination with concentric rotary elements, of a planetary driving member and a planetary driven member each operatively connected with both of said elements, said driving member being of the rolling adhesion or friction type and said driven member being in the form of a compound toothed gear and having toothed gear elements meshing with toothed gears on the said rotary elements respectively, a normally free internal gear and means for immobilizing said gear, said compound gear having an external gear element meshing with said internal gear, means for immobilizing one of the said rotary elements against rotation in a direction reverse to the normal direction of the orbital movement of the driving planetary, and means for rendering the last-named immobilizing means inoperative.

23. In a transmission mechanism, the combination with concentric rotary elements, of planetary driving and driven members each operatively connected with both of said elements, means for immobilizing one of said rotary elements against rotation in a direction reverse to the movement in its orbital path of the driving planetary, means for rendering said immobilizing means inoperative, a normally free rotary member and adjustable means for immobilizing said member, and means for operatively connecting said rotary member with the driven planetary whereby when said member is immobilized the said planetary reacts therewith to effect movement of the planetary in its orbital path.

24. In a transmission, the combination with driving and driven shafts, of means connecting said shafts and adjustable to vary the speed and torque relation thereof, said drive shaft comprising interthreaded parts whereby relative rotation of said parts results in an axial adjustment of one part with respect to the other, a spring confined between said parts and normally retaining the parts in relatively extended position, means for connecting the one part to a source of power, said power tending to advance said part axially with respect to the other against the pressure of the spring, an operating rod for said adjustable means extending longitudinally and centrally through said shaft and connected to the last-named shaft part, means for limiting the axial movement of said parts, means for adjusting the tension of said spring, said adjusting means comprising a threaded sleeve embracing the shaft and movable axially with said one part, means for preventing rotation of said sleeve, a nut on said sleeve forming an abutment for one end of the spring, and means for adjusting said nut on the sleeve.

JOHN S. SHARPE.